US008831794B2

(12) United States Patent
Persaud et al.

(10) Patent No.: US 8,831,794 B2
(45) Date of Patent: Sep. 9, 2014

(54) GESTURE RECOGNITION VIA AN AD-HOC PROXIMITY SENSOR MESH FOR REMOTELY CONTROLLING OBJECTS

(75) Inventors: Anthony G. Persaud, San Diego, CA (US); Mark R. Storch, San Diego, CA (US); Adrian J. Prentice, San Diego, CA (US); George Joseph, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 13/274,526

(22) Filed: Oct. 17, 2011

(65) Prior Publication Data
US 2012/0283896 A1 Nov. 8, 2012

Related U.S. Application Data

(60) Provisional application No. 61/482,241, filed on May 4, 2011.

(51) Int. Cl.
*G05D 1/00* (2006.01)
*A63F 13/20* (2014.01)
*G06F 3/01* (2006.01)
*E02F 9/20* (2006.01)

(52) U.S. Cl.
CPC ............... *A63F 13/06* (2013.01); *E02F 9/205* (2013.01); *G08C 2201/32* (2013.01); *A63F 2300/1012* (2013.01); *A63F 2300/1031* (2013.01); *A63F 2300/1043* (2013.01); *G06F 3/011* (2013.01)

USPC ............... 701/2; 701/49; 701/50; 340/12.22; 340/12.23; 340/12.24; 455/41.2

(58) Field of Classification Search
CPC ............................ E02F 9/205; G08C 2201/32
USPC ............... 455/41.2; 340/12.22, 12.23, 12.24; 701/2, 49, 50
See application file for complete search history.

(56) References Cited

U.S. PATENT DOCUMENTS 5,341,459 A * 8/1994 Backes .................... 700/260
6,176,837 B1 1/2001 Foxlin
(Continued)

FOREIGN PATENT DOCUMENTS

EP 2141632 A2 1/2010
WO 2004081602 A2 9/2004
(Continued)

OTHER PUBLICATIONS

"Bluetooth Technology", Mobileinfo.com, Jan. 21, 2001, all pages. http://web.archive.org/web/20010121155100/http://www.mobileinfo.com/Bluetooth/FAQ.htm.*

(Continued)

*Primary Examiner* — Calvin Cheung
(74) *Attorney, Agent, or Firm* — Paul S. Holdaway

(57) ABSTRACT

Apparatuses for remote operation of a first object by a second object is disclosed that one or more sensors configured to be placed on the second object and to obtain ranging information; and a processing system configured to determine one or more movements of the second object from the ranging information; and generate one or more control signals related to the one or more movements for manipulating the first object.

25 Claims, 7 Drawing Sheets

(56) References Cited

U.S. PATENT DOCUMENTS

| | | | |
|---|---|---|---|
| 6,675,130 B2 | 1/2004 | Kanevsky et al. | |
| 7,292,151 B2 | 11/2007 | Ferguson et al. | |
| 7,602,301 B1 | 10/2009 | Stirling et al. | |
| 8,187,182 B2* | 5/2012 | Kahn et al. | 600/300 |
| 2002/0055282 A1 | 5/2002 | Eldridge et al. | |
| 2002/0143277 A1 | 10/2002 | Wood et al. | |
| 2003/0060932 A1* | 3/2003 | Nakata | 700/245 |
| 2004/0046795 A1* | 3/2004 | Josephson et al. | 345/764 |
| 2004/0178955 A1 | 9/2004 | Menache et al. | |
| 2005/0258210 A1* | 11/2005 | Chu | 224/637 |
| 2006/0207409 A1* | 9/2006 | Kavana | 84/600 |
| 2007/0109324 A1* | 5/2007 | Lin | 345/671 |
| 2008/0136775 A1* | 6/2008 | Conant | 345/156 |
| 2008/0191864 A1 | 8/2008 | Wolfson | |
| 2008/0214305 A1 | 9/2008 | Addington et al. | |
| 2008/0228045 A1* | 9/2008 | Gao et al. | 600/301 |
| 2008/0297336 A1* | 12/2008 | Lee | 340/439 |
| 2009/0029754 A1 | 1/2009 | Slocum et al. | |
| 2009/0098519 A1* | 4/2009 | Byerly | 434/247 |
| 2009/0210093 A1* | 8/2009 | Jacobsen et al. | 700/260 |
| 2009/0221338 A1 | 9/2009 | Stewart et al. | |
| 2009/0222149 A1 | 9/2009 | Murray et al. | |
| 2009/0273485 A1* | 11/2009 | Wike | 340/686.6 |
| 2009/0280901 A1 | 11/2009 | Casparian et al. | |
| 2009/0295721 A1* | 12/2009 | Yamamoto et al. | 345/158 |
| 2010/0063794 A1* | 3/2010 | Hernandez-Rebollar | 704/3 |
| 2010/0083373 A1* | 4/2010 | White et al. | 726/21 |
| 2010/0141391 A1* | 6/2010 | Music et al. | 340/10.1 |
| 2010/0184563 A1 | 7/2010 | Molyneux et al. | |
| 2010/0302257 A1* | 12/2010 | Perez et al. | 345/474 |
| 2010/0304931 A1 | 12/2010 | Stumpf | |
| 2011/0009241 A1* | 1/2011 | Lane et al. | 482/8 |
| 2011/0010024 A1 | 1/2011 | Salisbury | |
| 2011/0040405 A1* | 2/2011 | Lim et al. | 700/245 |
| 2011/0058107 A1* | 3/2011 | Sun et al. | 348/734 |
| 2011/0306469 A1* | 12/2011 | Klabunde et al. | 482/8 |
| 2012/0166974 A1* | 6/2012 | Elford et al. | 715/760 |
| 2012/0226981 A1* | 9/2012 | Clavin | 715/719 |
| 2012/0229509 A1* | 9/2012 | Liu | 345/633 |
| 2012/0280902 A1 | 11/2012 | Persaud et al. | |
| 2013/0241819 A1* | 9/2013 | Yamashita | 345/156 |

FOREIGN PATENT DOCUMENTS

| | | |
|---|---|---|
| WO | 2007147012 A2 | 12/2007 |
| WO | 2010024525 A2 | 3/2010 |
| WO | WO2010049848 A1 * | 5/2010 |

OTHER PUBLICATIONS

"Wii Remote", Wikipedia, Dec. 30, 2007, all pages. http://web.archive.org/web/20071230104710/http://en.wikipedia.org/wiki/Wii_Remote#Colors.*

Starner, Thad. "Multimodal Gestural Control Using On-body Sensors --- Final Report,".

Georgia Institute of Technology, Atlanta, GA, Feb. 14, 2007, pp. 1-9.

International Search Report and Written Opinion—PCT/US2012/027585—ISA/EPO—Oct. 15, 2012.

Vlasic D., et al., "Practical Motion Capture in Everyday Surroundings", ACM Transactions on Graphics: TOG, ACM, US, vol. 26, No. 3, Jul. 29, 2007, pp. 35/1-35/10, XP007910935.

Quwaider M, et al., "Body-Posture-Based Dynamic Link Power Control in Wearable Sensor Networks", IEEE Communications Magazine, vol. 48, No. 7, Jul. 2010.

\* cited by examiner

GESTURE RECOGNITION VIA AN AD-HOC PROXIMITY SENSOR MESH FOR REMOTELY CONTROLLING OBJECTS

PRIORITY CLAIM

This application claims the benefit of U.S. Provisional Patent application Ser. No. 61/482,241, entitled "GESTURE RECOGNITION VIA AN AD-HOC PROXIMITY SENSOR MESH FOR REMOTELY CONTROLLING OBJECTS", which was filed May 4, 2011. The entirety of the aforementioned application is herein incorporated by reference.

BACKGROUND

1. Field

Certain aspects of the disclosure set forth herein generally relate to motion capture and, more particularly, to gesture recognition via an ad-hoc proximity sensor mesh for remotely controlling vehicles.

2. Background

Body tracking systems have been progressing on two different fronts. First, professional grade "motion capture" systems are available that can capture motion of an actor, athlete, player, etc. with high fidelity for use by movie and game studios, for example. These systems are typically high-cost, and thus not suitable for consumer grade applications. Second, consumer grade game controllers have progressed recently from being based on button or mechanical switches, to being based on player movement detection. Since these are consumer products, the technology is much lower cost, and in general, much lower in the quality of performance as well. For example, in the Nintendo Wii® system, low-cost inertial sensors can detect hand motion that is used to control the game play. Issues with the accuracy of this type of game control have driven the rise in use of camera-based motion capture. For example, the Sony PlayStation® Move system can use a camera to track a spherical feature on the handheld game controller; this input can be combined with inertial sensor data to detect motion. Furthermore, the Microsoft Kinect® system is capable of removing the controller entirely and can use combination of traditional and depth detecting cameras to detect the body motion utilizing the camera alone.

There are several areas of concern with current motion capture systems. First, these systems suffer from performance issues that limit the types of motions that are detectable and that limit the types of games and user interactions that are possible. For example, camera systems only work on things that are in the field of view of the camera, and that are not blocked by objects or people. Second, camera augmentation systems are constrained to operating in an environment where a stationary camera can be mounted and installed—most commonly in a living room or a den. Further, current camera systems used for human body motion capturing are neither scalable nor capable of being used effectively in outdoor environments due to several limiting factors including, but not limited to, occlusion, frequency interference, and weather/lighting conditions. In addition, the use of large two dimensional (2D) touch displays for manipulating three dimensional (3D) objects or controlling vehicles is not highly effective and intuitive without the use of human gesture recognition. Therefore, technology advances are desired to enable improvements in body tracking performance and to enable these systems to go wherever the user wants to go, whether these systems are used in a commercial or consumer application. Example commercial applications include accurate motion capture for gesture recognition in a variety of environments. Example consumer applications include mobile gaming between one or more players, and sports performance tracking and training, whether outdoors or in a gym. Further, there are many more potential applications for mobile body tracking that may emerge if such tracking technology is available at reasonable prices and sufficient performance levels.

SUMMARY

In one aspect of the disclosure, an apparatus for remote operation of a first object by a second object including one or more sensors configured to be placed on the second object and to obtain ranging information; and a processing system. The processing system is configured to determine one or more movements of the second object from the ranging information; and generate one or more control signals related to the one or more movements for manipulating the first object.

In another aspect of the disclosure, an apparatus for remote operation of a first object by a second object including one or more means for sensing configured to be placed on the second object and to obtain ranging information; means for determining one or more movements of the second object from the ranging information; and means for generating one or more control signals related to the one or more movements for manipulating the first object.

In yet another aspect of the disclosure, a method for remote operation of a first object by a second object includes obtaining ranging information via one or more sensors configured to be placed on the second object; determining one or more movements of the second object from the ranging information; and generating one or more control signals related to the one or more movements for manipulating the first object.

In yet another aspect of the disclosure, a computer program product for remote operation of a first object by a second object is disclosed that includes a machine-readable medium having instructions executable for obtaining ranging information via one or more sensors configured to be placed on the second object; determining one or more movements of the second object from the ranging information; and generating one or more control signals related to the one or more movements for manipulating the first object.

In yet another aspect of the disclosure, a remote control system for remote operation of a first object by a second object includes one or more sensors configured to be placed on the second object and to obtain ranging information; at least one antenna; and a processing system. The processing system is configured to determine one or more movements of the second object from the ranging information; generate one or more control signals related to the one or more movements for manipulating the first object; and transmit the one or more control signals to the first object via the at least one antenna.

BRIEF DESCRIPTION OF THE DRAWINGS

So that the manner in which the above-recited features of the disclosure set forth herein can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
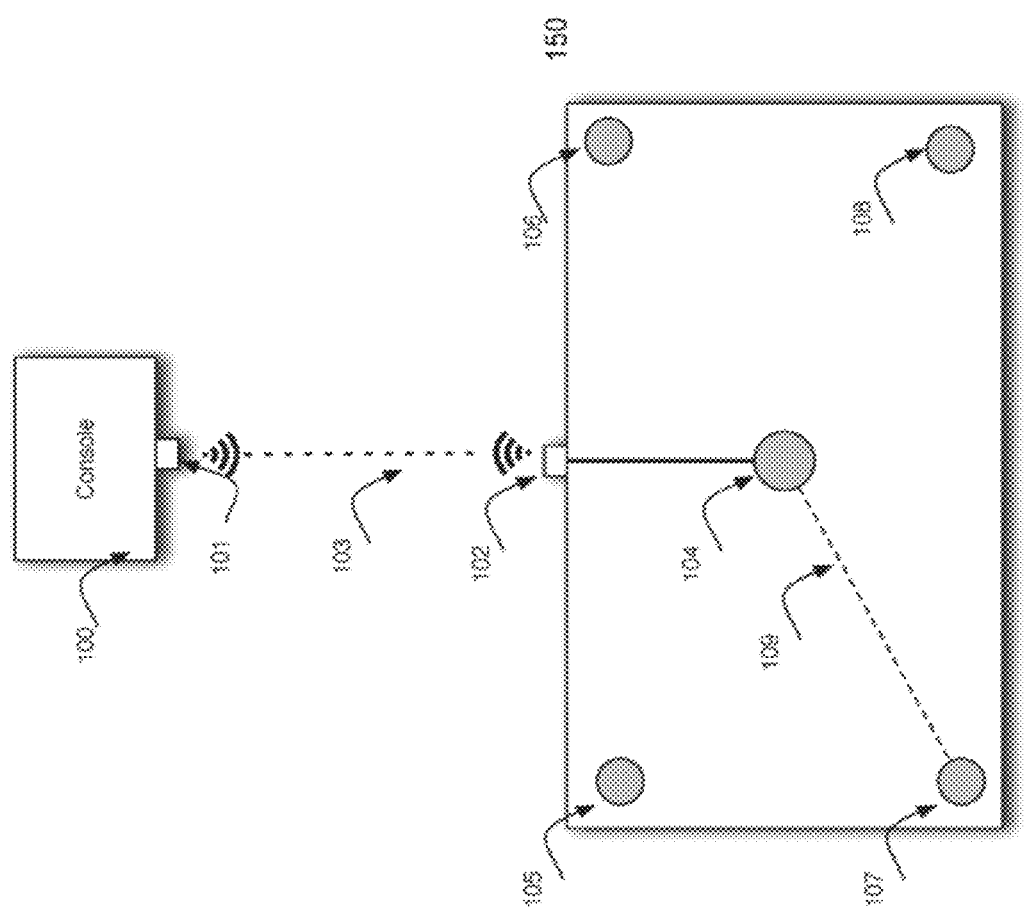
FIG. 1 is a diagram illustrating an example of an ad-hoc proximity sensor mesh utilizing proximity sensors to enable human gesture recognition in accordance with certain aspects of the disclosure set forth herein.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Further, although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In one aspect, a method of utilizing an ad-hoc mesh surface utilizing proximity sensors to enable remote management of vehicles and devices through 3D human gesture recognition is set forth herein. The method includes creating a portable proximity sensor surface by laying out a plurality of proximity sensors on a horizontal surface. The user wears separate sensors on specific limbs that the ground sensors track over a period of time. As the user performs different gestures with their hands, feet, and body, the ground sensors recognize different gestures as commands and sent to a corresponding main controller. The main controller wirelessly relays these gestures and commands to remote vehicles (e.g., a construction crane in the diagram), which allow the user to coordinate the actions of that vehicle (e.g., lowering/lifting the crane, picking up objects, etc.).

The disclosed approach does not require the use of a motion capture camera and is not affected by external interference since the proximity sensors described herein uses a high frequency band not used by Wi-Fi or cell phones. Further, the proximity sensors described herein utilize extremely low power, which allow for longer external use with battery systems. The use of 5 channels at 1.1 Mbps provides ample transfer rate for the most data intensive proximity data. The use of a mesh of proximity sensors to create a virtual rectangular pillar area in which users can perform an unlimited number of motions that can be captured as gestures and understood as commands.

The techniques described herein may be used for various broadband wireless communication systems, including communication systems that are based on an orthogonal multiplexing scheme and a single carrier transmission. Examples of such communication systems include Orthogonal Frequency Division Multiple Access (OFDMA) systems, Single-Carrier Frequency Division Multiple Access (SC-FDMA) systems, Code Division Multiple Access (CDMA), and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A CDMA system may utilize spread-spectrum technology and a coding scheme where each transmitter (i.e., user) is assigned a code in order to allow multiple users to be multiplexed over the same physical channel.

The teachings herein may be incorporated into, implemented within, or performed by, a variety of wired or wireless apparatuses, or nodes. In some aspects, a wireless node implemented in accordance with the teachings herein may comprise a body-mounted node, a stationary estimator node, an access point, an access terminal, etc. Certain aspects of the disclosure set forth herein may support methods implemented in body area networks (BANs). The BAN represents a concept for continuous body monitoring for motion capture, diagnostic purposes in medicine, etc.

FIG. 1 illustrates an example of an ad-hoc proximity mesh system that may be used to remotely control objects. The wireless system includes a receiver console 100 that receives proximity data provided wirelessly using a wireless receiver 101. The proximity data that is transmitted by a wireless transmitter 102 to the wireless receiver 101 is encapsulated in a wireless protocol 103, and is provided by a mat 150.

The mat 150 includes a plurality of proximity sensors 105 to 108, which may be any number of proximity sensors depending on requirements of a particular implementation. Each of these proximity sensors, also referred to as nodes, may range with another node. The mat 150 also includes a proximity sensor 104 that acts as a central node coordinator for coordinating communications between the plurality of proximity sensors 105 to 108 and the proximity data that is provided to wireless transmitter 102. In another aspect of the disclosure set forth herein, any one of the plurality of proximity sensors 105 to 108 may be used as a central node coordinator. In addition, the functionality provided by wireless transmitter 102 and wireless receiver 101 may be provided by a proximity sensor.

In one aspect of the mat 150, the plurality of proximity sensors 105 to 108, as well as the proximity sensor 104 and wireless transmitter 102 are mounted to a substrate made of a material such as plastic or foam. In another aspect, the mat 150 may be a virtual mat—in that the plurality of sensors are not mechanically coupled to each other, but form a "mat" or "mesh" by their placement on the ground or any other surface. Thus, for example, the plurality of proximity sensors 105 to 108 and the proximity sensor 104 may be simply placed on the ground by a user. Each of them would then determine their positions relative to each other using ranging.

The receiver console 100 will receive the data from the wireless transmitter 102 and process the ranging information. The data received from the wireless transmitter 102 may also contain processed information, such as gesture or movement information detected from the movements of a body as described herein. Further still, the wireless transmitter 102 may generate and transmit control and command information signals based on the gesture and movement information detected as described herein.

Figure 2:
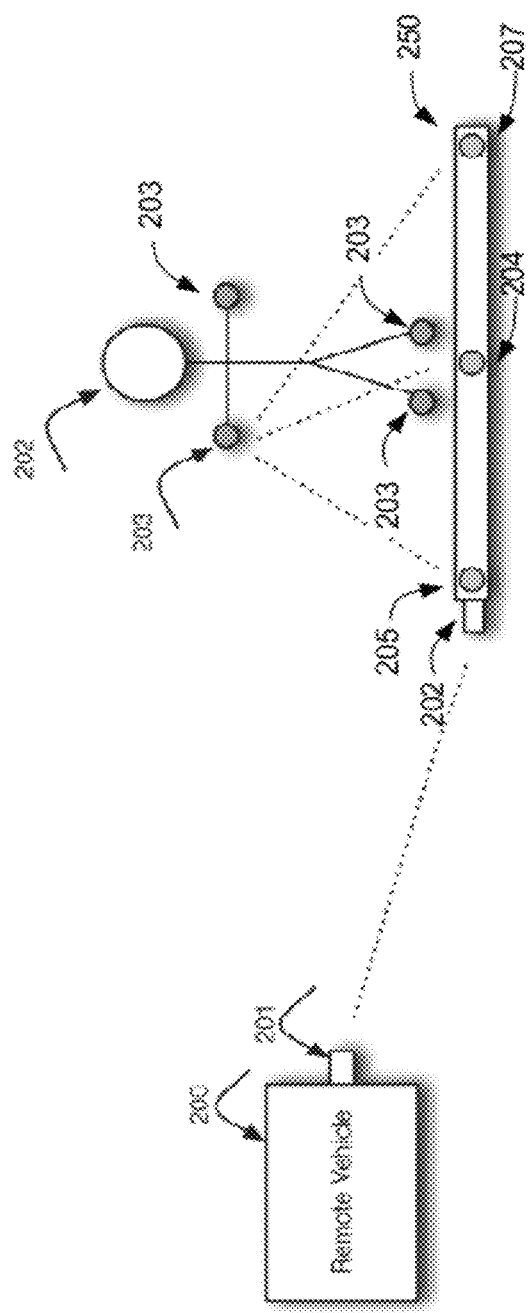
FIG. 2 is a diagram illustrating an example of a system for remote management of objects through human gesture recognition using the ad-hoc proximity sensor mesh of FIG. 1.

FIG. 2 illustrates the use of the ad-hoc proximity sensor mesh in the mat 150 illustrated as a mat 250 being used to control objects, which in this example is a remote vehicle 200 that includes a wireless receiver 201 for receiving proximity and gesture data that is wirelessly transmitted by a wireless transmitter 202 of the mat 250. In aspect of the disclosed approach, a user 202 wears a plurality of proximity sensors 203. In an aspect of the disclosure set forth herein, the plurality of proximity sensors 203 worn on the body may mutually communicate as being part of a BAN. The BAN communicates with proximity sensors 204-208 on the mat 250 to provide accurate motion capture and gesture detection of the user's movement. The BAN and the mat 250 may be viewed as a wireless communication system where various wireless nodes communicate using either orthogonal multiplexing scheme or a single carrier transmission. Each body and mat-mounted node may comprise a wireless sensor that senses (acquires) one or more signals associated with a movement of the user's body and communicates the signals to the remote vehicle 200. Linear distance calculations are performed for each proximity sensor worn by the user 202 and each proximity sensor on the mat 250. The calculations are also performed over time. In one aspect, the wireless nodes in described herein may operate in accordance with compressed sensing (CS), where an acquisition rate may be smaller than the Nyquist rate of a signal being acquired.

Figure 3:
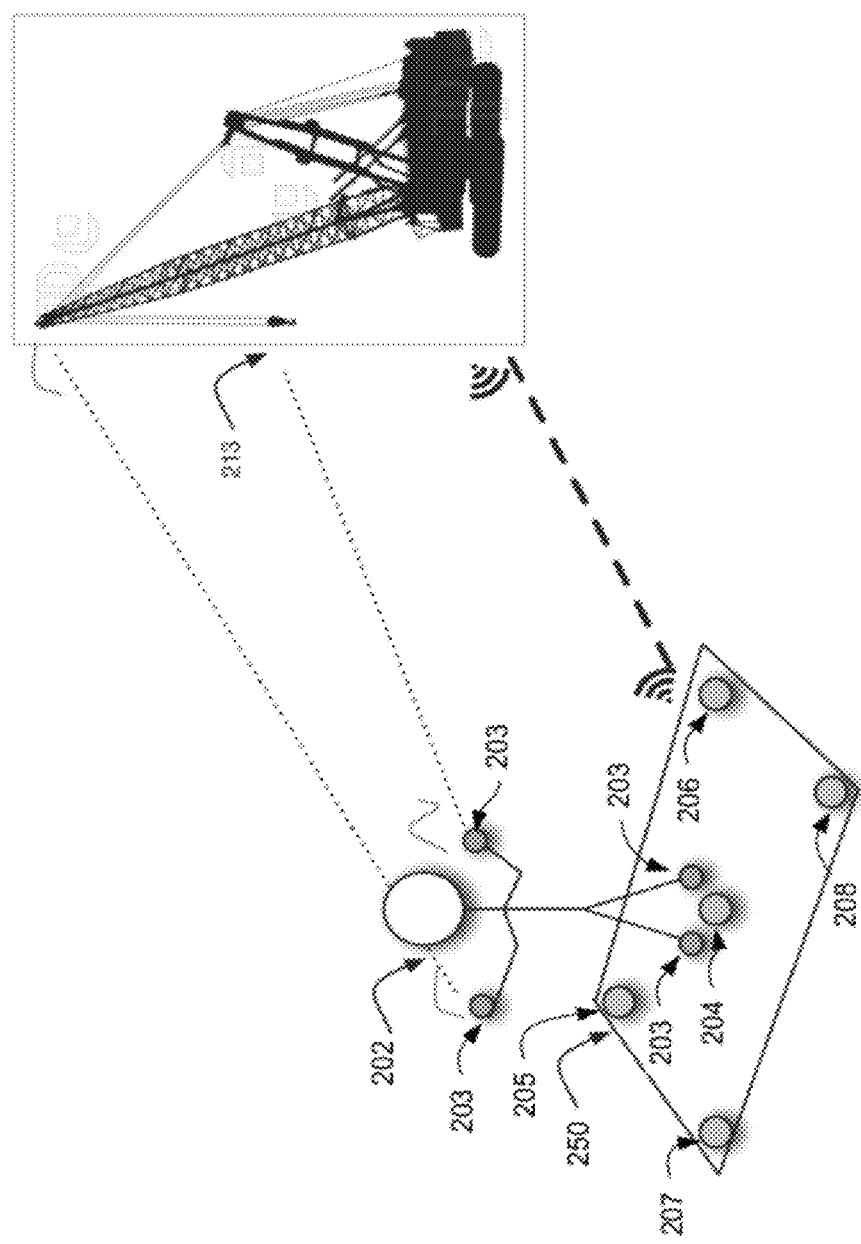
FIG. 3 is a block diagram illustrating the use of the system for remote control of objects in FIG. 2 for the control of a crane in accordance with certain aspects of the disclosure set forth herein.

FIG. 3 illustrates a specific example of the use of the system in FIG. 2 where the user 202 wears the plurality of proximity sensor 203 while making gestures that are sent wirelessly to a remote vehicle 213. In the example provided, the remote vehicle 213 is a construction crane. The user 202 may control the operation of the remote vehicle 213 using movement of various body parts. In one aspect of the remote control, gestures to control the remote vehicle 213 may be composed of one or more distinct body motions.

Figure 4:
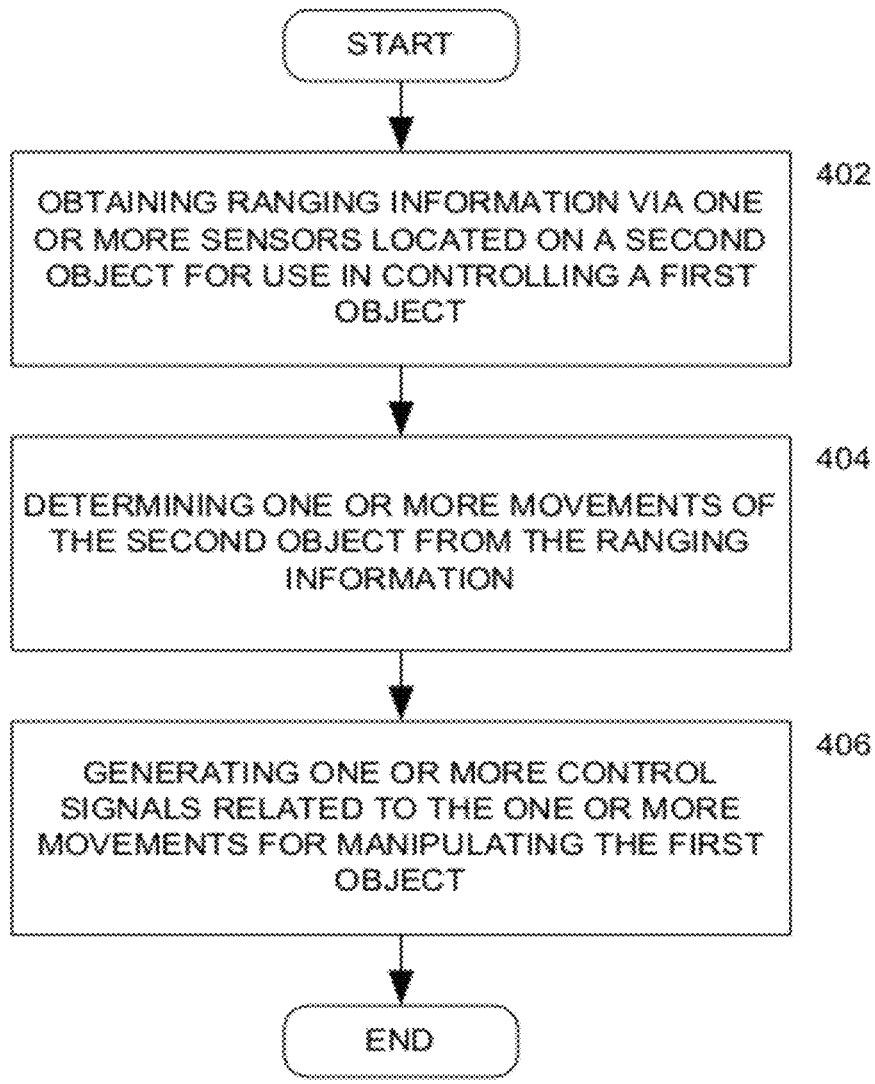
FIG. 4 is a flow diagram illustrating a remote object management operation in accordance with certain aspects of the disclosure set forth herein.

FIG. 4 illustrates a remote object management process 400 where a first object is controlled by a second object. At 402, ranging information is obtained via one or more sensors located on the second object for use in controlling the first object. At 404, one or more movements of the second object is determined from the ranging information. At 406, one or more control signals related to the one or more movements for manipulating the first object are generated.

Figure 5:
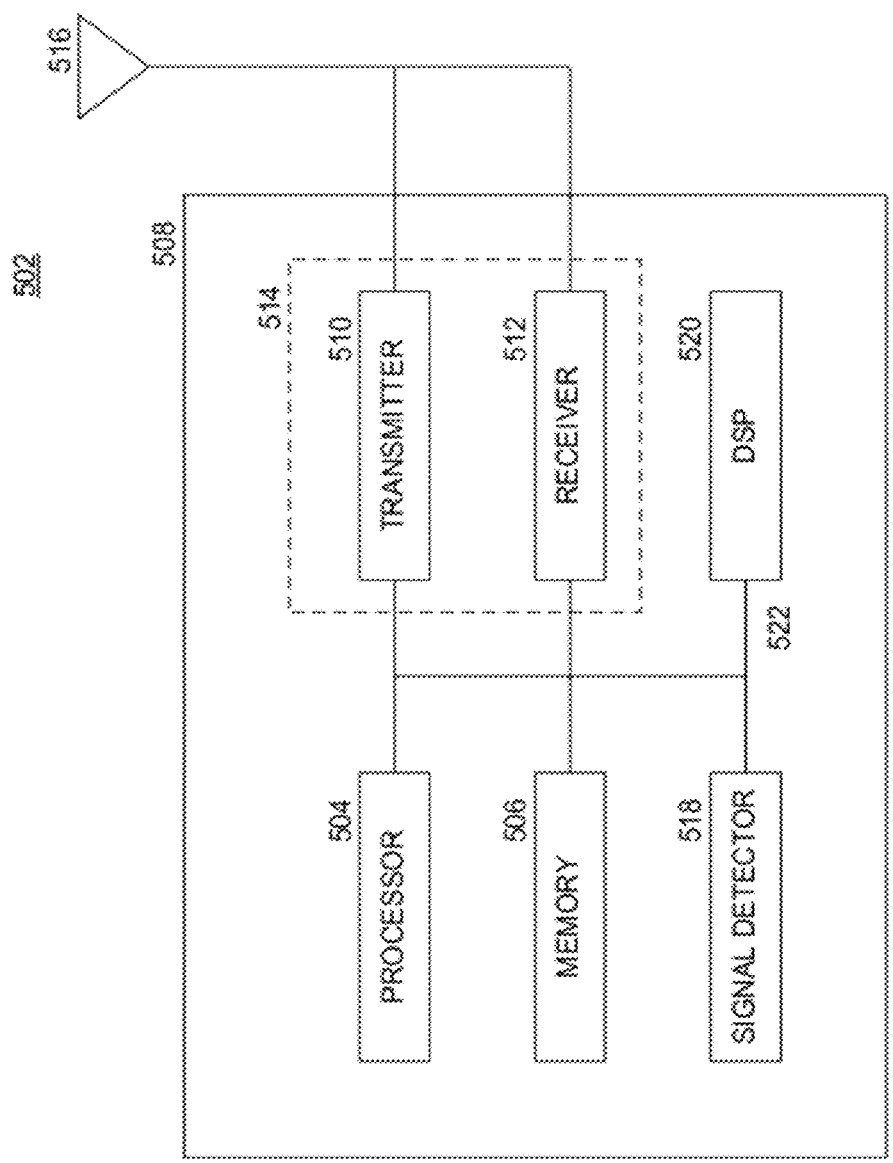
FIG. 5 is a block diagram illustrating various components that may be utilized in a wireless device of the BAN in accordance with certain aspects of the disclosure set forth herein.

FIG. 5 illustrates various components that may be utilized in a wireless device (wireless node) 500 that may be employed within the system from FIG. 1. The wireless device 500 is an example of a device that may be configured to implement the various methods described herein. The wireless device 500 may be used to implement any one of the proximity sensor 104 and plurality of proximity sensors 105-108 in the mat 150, or the plurality of proximity sensor 203 worn by the user 202.

The wireless device 500 may include a processor 504 which controls operation of the wireless device 500. The processor 504 may also be referred to as a central processing unit (CPU). Memory 506, which may include both read-only memory (ROM) and random access memory (RAM), provides instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable to implement the methods described herein.

The wireless device 500 may also include a housing 508 that may include a transmitter 510 and a receiver 512 to allow transmission and reception of data between the wireless device 500 and a remote location. The transmitter 510 and receiver 512 may be combined into a transceiver 514. An antenna 516 may be attached to the housing 508 and electrically coupled to the transceiver 514. The wireless device 500 may also include (not shown) multiple transmitters, multiple receivers, multiple transceivers, and/or multiple antennas.

The wireless device 500 may also include a signal detector 518 that may be used in an effort to detect and quantify the level of signals received by the transceiver 514. The signal detector 518 may detect such signals as total energy, energy per subcarrier per symbol, power spectral density and other signals. The wireless device 500 may also include a digital signal processor (DSP) 520 for use in processing signals.

The various components of the wireless device 500 may be coupled together by a bus system 522, which may include a power bus, a control signal bus, and a status signal bus in addition to a data bus.

In many current systems, mobile body tracking may employ inertial sensors mounted to a body associated with the BAN. These systems may be limited in that they suffer from limited dynamic range and from the estimator drifts that are common with inertial sensors. Also, acceptable body motion estimation may require a large number of sensor nodes (e.g., a minimum of 15), since each articulated part of the body may require a full orientation estimate. Further, existing systems may require the performance of industrial grade inertial sensors, increasing cost, etc. For many applications, ease of use and cost are typically of the utmost importance. Therefore, it is desirable to develop new methods for reducing the number of nodes required for mobile body tracking while maintaining the required accuracy.

In various aspects of the disclosure set forth herein, ranging is referred to in various implementations. As used herein, ranging is a sensing mechanism that determines the distance between two ranging detection equipped nodes such as two proximity sensors. The ranges may be combined with measurements from other sensors such as inertial sensors to correct for errors and provide the ability to estimate drift components in the inertial sensors. According to certain aspects, a set of body mounted nodes may emit transmissions that can be detected with one or more stationary ground reference nodes. The reference nodes may have known position, and may be time synchronized to within a fraction of a nanosecond. However, having to rely on solutions utilizing stationary ground reference nodes may not be practical for many applications due its complex setup requirements. Therefore, further innovation may be desired.

Certain aspects of the disclosure set forth herein support various mechanisms that allow a system to overcome the limitations of previous approaches and enable products that have the characteristics required for a variety of applications.

It should be noted that while the term "body" is used herein, the description can also apply to capturing pose of machines such as robots. Also, the presented techniques may apply to capturing the pose of props in the activity, such as swords/shields, skateboards, racquets/clubs/bats.

As discussed herein, inertial sensors as described herein include such sensors as accelerometers, gyros or inertial measurement units (IMU). IMUS are a combination of both accelerometers and gyros. The operation and functioning of these sensors are familiar to those of ordinary skill in the art.

Ranging is a sensing mechanism that determines the distance between two equipped nodes. The ranges may be combined with inertial sensor measurements into the body motion estimator to correct for errors and provide the ability to estimate drift components in the inertial sensors. According to certain aspects, a set of body mounted nodes may emit transmissions that can be detected with one or more stationary ground reference nodes. The reference nodes may have known position, and may be time synchronized to within a fraction of a nanosecond. However, as noted previously, this system may not be practical for a consumer-grade product due its complex setup requirements. Therefore, further innovation may be desired.

In one aspect of the disclosed system, range information associated with the body mounted nodes may be produced based on a signal round-trip-time rather than a time-of-arrival. This may eliminate any clock uncertainty between the two nodes from the range estimate, and thus may remove the requirement to synchronize nodes, which may dramatically simplify the setup. Further, the proposed approach makes all nodes essentially the same, since there is no concept of "synchronized nodes" versus "unsynchronized nodes".

The proposed approach may utilize ranges between any two nodes, including between different body worn nodes. These ranges may be combined with inertial sensor data and with constraints provided by a kinematic body model to estimate body pose and motion. Whereas the previous system performed ranging only from a body node to a fixed node, removing the time synch requirement may enable to perform ranging between any two nodes. These additional ranges may be very valuable in a motion tracking estimator due to the additional range data available, and also due to the direct sensing of body relative position. Ranges between nodes on different bodies may be also useful for determining relative position and pose between the bodies.

With the use of high-accuracy round trip time ranges and ranges between nodes both on and off the body, the number and quality of the inertial sensors may be reduced. Reducing the number of nodes may make usage much simpler, and reducing the required accuracy of the inertial sensors may reduce cost. Both of these improvements can be crucial in producing a system suitable for consumer products.

Figure 6:
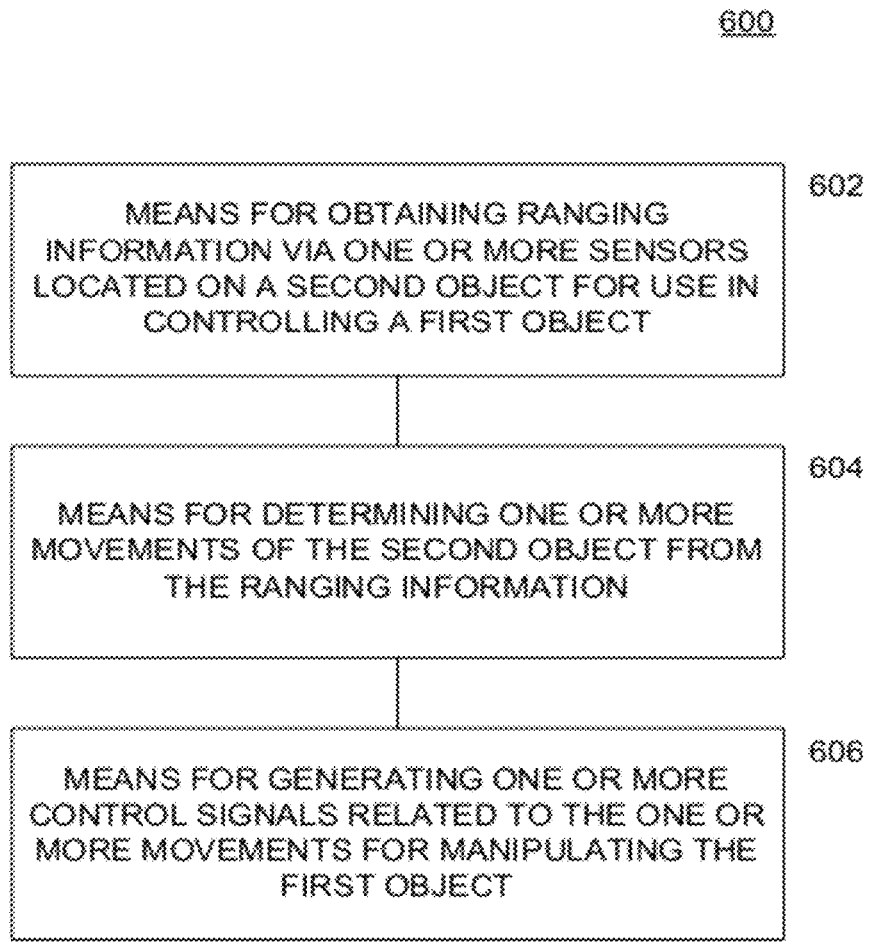
FIG. 6 is a diagram illustrating example means capable of performing the operations shown in FIG. 4.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, FIG. 6 illustrating an example of an apparatus 600 for remote operation of a first object by a second object. The apparatus 600 includes one or more means for sensing configured to be placed on the second object and to obtain ranging information 602; means for determining one or more movements of the second object from the ranging information 604; and means for generating one or more control signals related to the one or more movements for manipulating the first object 606.

Further, in general, a means for sensing may include one or more proximity sensors such as proximity sensors 105, inertial sensors, or any combinations thereof. A means for transmitting may comprise a transmitter (e.g., the transmitter unit 510) and/or an antenna 516 illustrated in FIG. 5. Means for receiving may comprise a receiver (e.g., the receiver unit 512) and/or an antenna 516 illustrated in FIG. 5. Means for processing, means for determining, or means for using may comprise a processing system, which may include one or more processors, such as the processor 504 illustrated in FIG. 5.

Figure 7:
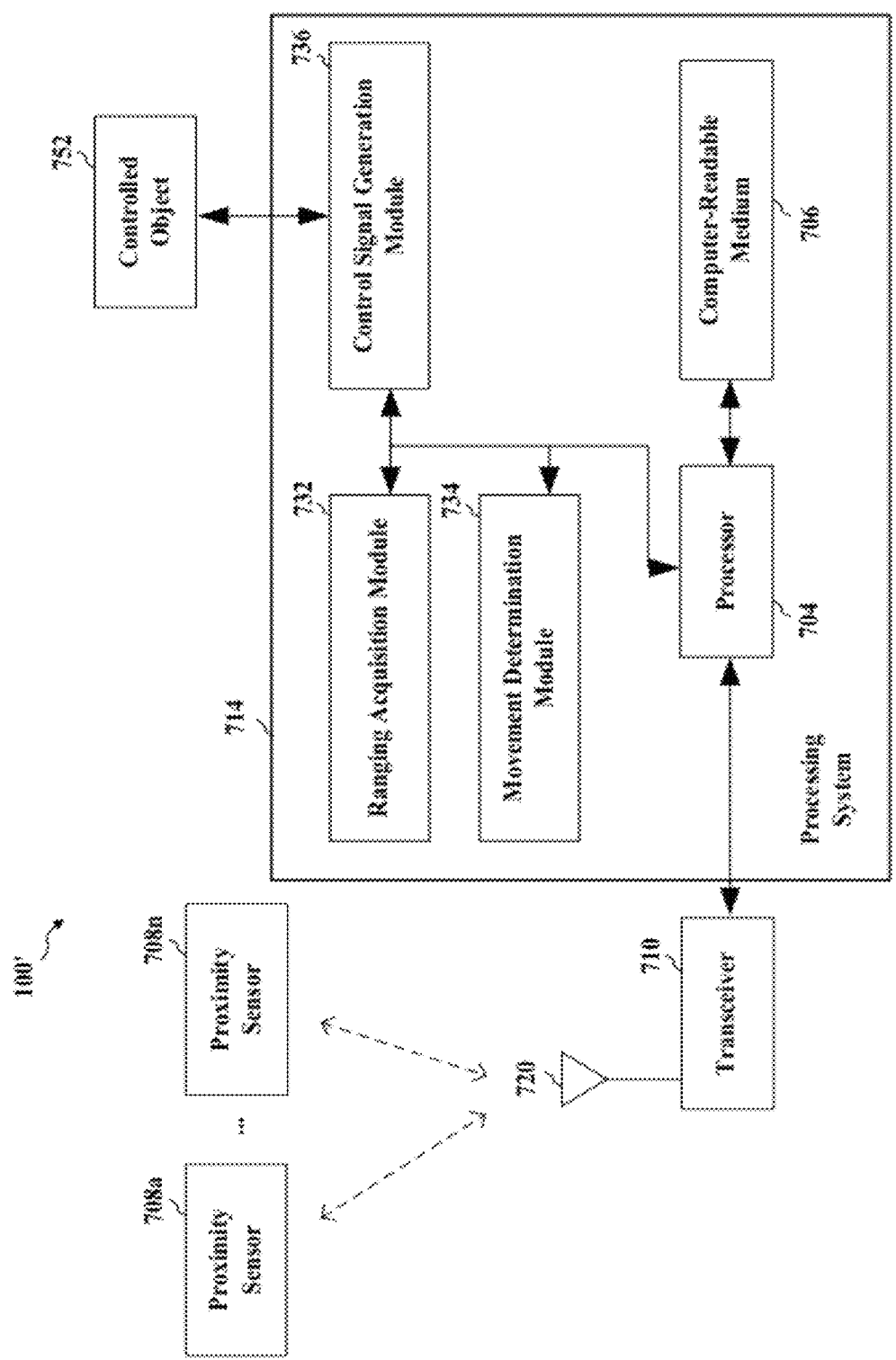
FIG. 7 is a diagram illustrating an example of a hardware implementation for an apparatus employing a processing system that may be used to implement gesture recognition via an ad-hoc proximity sensor mesh for remotely controlling objects.

FIG. 7 is a diagram illustrating an example of a hardware implementation 100' for the console 100 employing a processing system 714. The apparatus 100' includes a processing system 714 coupled to a transceiver 710. The transceiver 710 is coupled to one or more antennas 720. The transceiver 710 provides a means for communicating with various other apparatus over a transmission medium. For example, the transceiver 710 may communicate with a plurality of proximity sensors 708*a*-708*n* such as that worn by a user. The processing system 714 includes a processor 704 coupled to a computer-readable medium 706. The processor 704 is responsible for general processing, including the execution of software stored on the computer-readable medium 706. The software, when executed by the processor 704, causes the processing system 714 to perform the various functions described supra for any particular apparatus. The computer-readable medium 706 may also be used for storing data that is manipulated by the processor 704 when executing software.

The processing system 714 includes a module 732 for acquiring ranging information from the plurality of proximity sensors 708*a*-708*b*. The ranging information is used to control an object, such as the remote vehicle 200. The processing system 714 further includes a module 734 for determining movement of the user from the ranging information; and a module 736 for generating one or more control signals related to the one or more movements for manipulating a controlled object 752. In one aspect, the console 100 may be integrated as part of the remote vehicle 200, which is illustrated in FIG. 7 as the controlled object 752. The modules may be software modules running in the processor 704, resident/stored in the computer readable medium 706, one or more hardware modules coupled to the processor 704, or some combination thereof.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The various illustrative logical blocks, modules and circuits described in connection with the disclosure set forth herein may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. The steps of a method or algorithm described in connection with the disclosure set forth herein may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

A processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

As described herein, a wireless device/node in the disclosure set forth herein may include various components that perform functions based on signals that are transmitted by or received at the wireless device. A wireless device may also refer to a wearable wireless device. In some aspects the wearable wireless device may comprise a wireless headset or a wireless watch. For example, a wireless headset may include a transducer adapted to provide audio output based on data received via a receiver. A wireless watch may include a user interface adapted to provide an indication based on data received via a receiver. A wireless sensing device may include a sensor adapted to provide data to be transmitted via a transmitter.

A wireless device may communicate via one or more wireless communication links that are based on or otherwise support any suitable wireless communication technology. For example, in some aspects a wireless device may associate with a network. In some aspects the network may comprise a personal area network (e.g., supporting a wireless coverage area on the order of 30 meters) or a body area network (e.g., supporting a wireless coverage area on the order of 60 meters) implemented using ultra-wideband technology or some other suitable technology. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 510 and receiver 512) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA") or so-called smart-phone, an entertainment device (e.g., a portable media device, including music and video players), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitoring device that may receive data from the medical or environment sensing device (e.g., a desktop, a mobile computer, etc.), a point-of-care device, a hearing aid, a set-top box, or any other suitable device. The monitoring device may also have access to data from different sensing devices via connection with a network. These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless device also may be capable of transmitting and/or receiving information in a non-wireless manner (e.g., via a wired connection) via an appropriate communication interface.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for remote operation of a first object by a second object comprising:
a first plurality of sensors configured to obtain first ranging information;
a second plurality of sensors in communication with the first plurality of sensors, the second plurality of sensors being configured to be placed on the second object and to obtain second ranging information; and
a processing system configured to:
determine one or more movements of the second object from the second ranging information; and
generate one or more control signals related to the one or more movements for manipulating the first object.

2. The apparatus of claim 1, wherein the first plurality of sensors are located on a flat surface and the second plurality of sensors form part of a body area network, and wherein the processing system is further configured to determine the one or more movements from the first ranging information and the second ranging information.

3. The apparatus of claim 1, wherein the one or more control signals generated by the processing system are configured to cause at least one movement of the first object that mimics the one or more movements of the second object.

4. The apparatus of claim 1, wherein the one or more movements comprise one or more gestures.

5. The apparatus of claim 1, further comprising a transmitter configured to transmit the one or more control signals to the first object.

6. The apparatus of claim 1, wherein the second object comprises a part of a human body.

7. An apparatus for remote operation of a first object by a second object comprising:
a first plurality of means for sensing and configured to obtain first ranging information;
a second plurality of means for sensing in communication with the first plurality of means for sensing, wherein the second plurality of means for sensing being configured to be placed on the second object and to obtain second ranging information;
means for determining one or more movements of the second object from the second ranging information; and
means for generating one or more control signals related to the one or more movements for manipulating the first object.

8. The apparatus of claim 7, further comprising means for determining the one or more movements from the first ranging information and the second ranging information; and wherein the first plurality of means for sensing are located on a flat surface and the second plurality of means for sensing form part of a body area network.

9. The apparatus of claim 7, wherein the means for generating the one or more control signals is configured to cause at least one movement of the first object that mimics the one or more movements of the second object.

10. The apparatus of claim 7, wherein the one or more movements comprises one or more gestures.

11. The apparatus of claim 7, further comprising a transmitter means configured to transmit the one or more control signals to the first object.

12. The apparatus of claim 7, wherein the second object comprises a part of a human body.

13. A method for remote operation of a first object by a second object comprising:
obtaining first ranging information via a first plurality of sensors;
obtaining second ranging information via a second plurality of sensors configured to be placed on the second object, the second plurality of sensors further configured to be in communication with the first plurality of sensors;
determining one or more movements of the second object from the second ranging information; and
generating one or more control signals related to the one or more movements for manipulating the first object.

14. The method of claim 13, wherein the first plurality of sensors is located on a flat surface and the second plurality of sensors forms part of a body area network, and wherein determining the one or more movements of the second object from the second ranging information comprises determining the one or more movements from the first ranging information and the second ranging information.

15. The method of claim 13, further comprising causing at least one movement of the first object that mimics the one or more movements of the second object via the one or more control signals generated by the processing system.

16. The method of claim 13, wherein the one or more movements comprises one or more gestures.

17. The method of claim 13, further comprising transmitting the one or more control signals to the first object via a transmitter.

18. The method of claim 13, wherein the second object comprises a part of a human body.

19. A computer program product for remote operation of a first object by a second object comprising:
a non-transitory machine-readable medium comprising instructions executable for:
obtaining first ranging information via a first plurality of sensors;
obtaining second ranging information via a second plurality of sensors configured to be placed on the second object, the second plurality of sensors being in communication with the first plurality of sensors;
determining one or more movements of the second object from the second ranging information; and
generating one or more control signals related to the one or more movements for manipulating the first object.

20. The computer program product of claim 19, wherein the first plurality of sensors is located on a flat surface and the second plurality of sensors forms part of a body area network, and wherein determining the one or more movements of the second object from the second ranging information comprises determining the one or more movements from the first ranging information and the second ranging information.

21. The computer program product of claim 19, wherein the non-transitory machine-readable medium further comprising instructions executable for causing at least one movement of the first object that mimics the one or more movements of the second object via the one or more control signals generated by the processing system.

22. The computer program product of claim 19, wherein the one or more movements comprises one or more gestures.

23. The computer program product of claim 19, wherein the non-transitory machine-readable medium further comprising instructions executable for transmitting the one or more control signals to the first object via a transmitter.

24. The computer program product of claim 19, wherein the second object comprises a part of a human body.

25. A remote control system for remote operation of a first object by a second object comprising:
- a first plurality of sensors configured to obtain first ranging information;
- a second plurality of sensors in communication with the first plurality of sensors, the second plurality of sensors being configured to be placed on the second object and to obtain second ranging information;
- at least one antenna; and
- a processing system configured to:
    - determine one or more movements of the second object from the second ranging information;
    - generate one or more control signals related to the one or more movements for manipulating the first object; and
    - transmit the one or more control signals to the first object via the at least one antenna.

* * * * *